Figure 1:
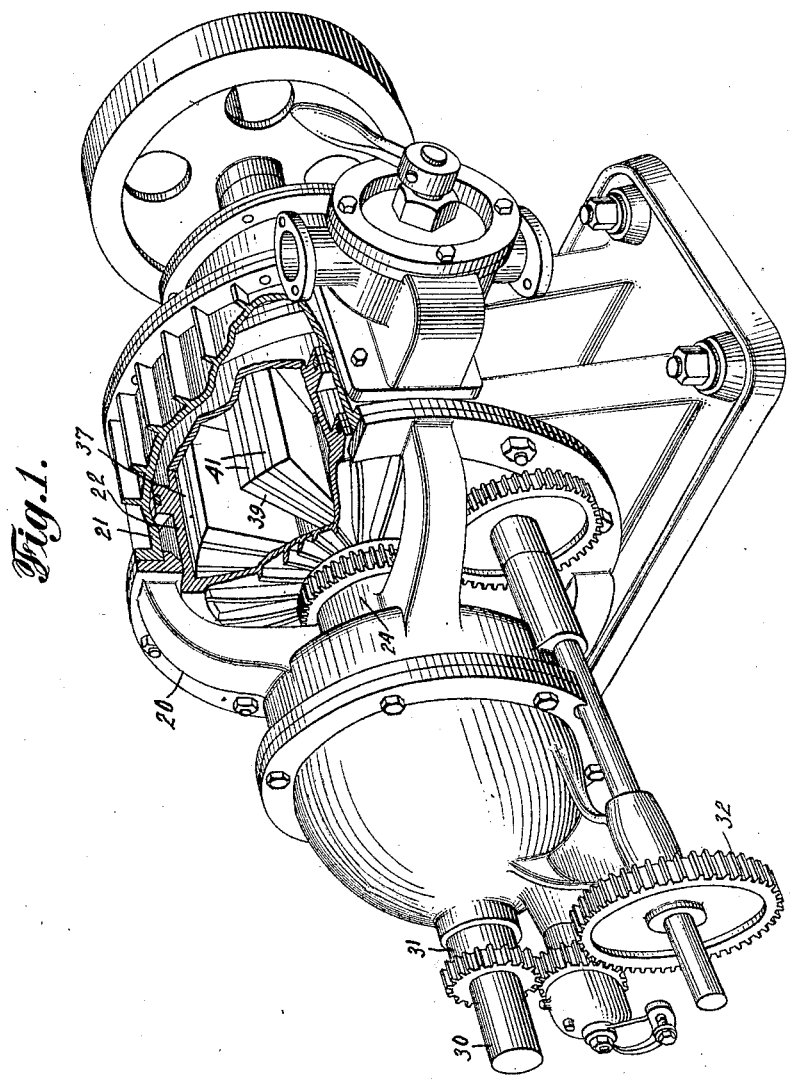

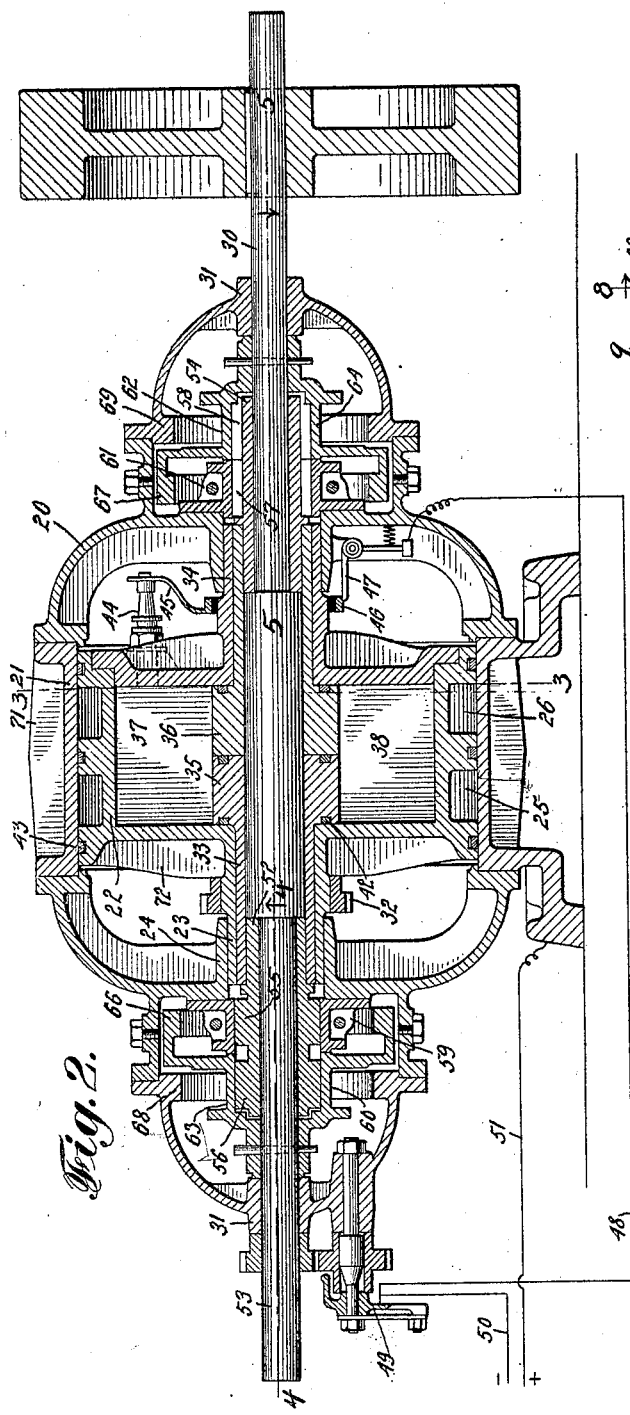

June 12, 1923.
V. CIZEK
1,458,641
ROTARY INTERNAL COMBUSTION ENGINE
Filed Feb. 28, 1921  4 Sheets-Sheet 3
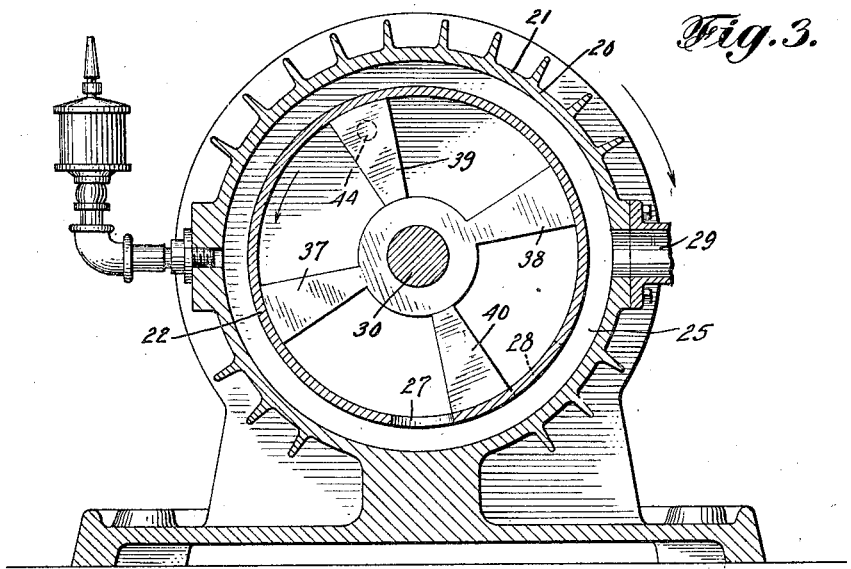
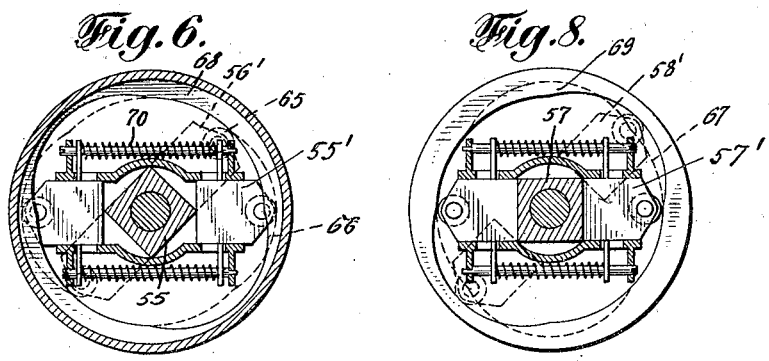
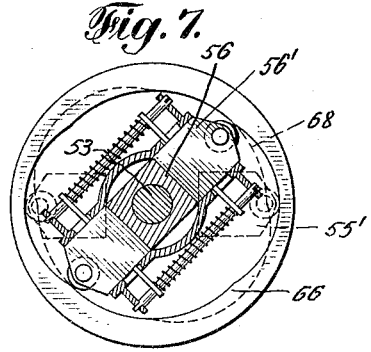
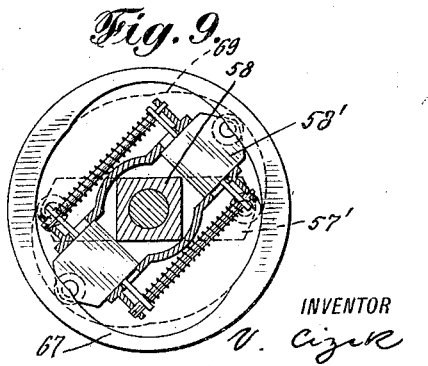
INVENTOR
V. Cizek
BY
Sigmund Herzog
ATTORNEY

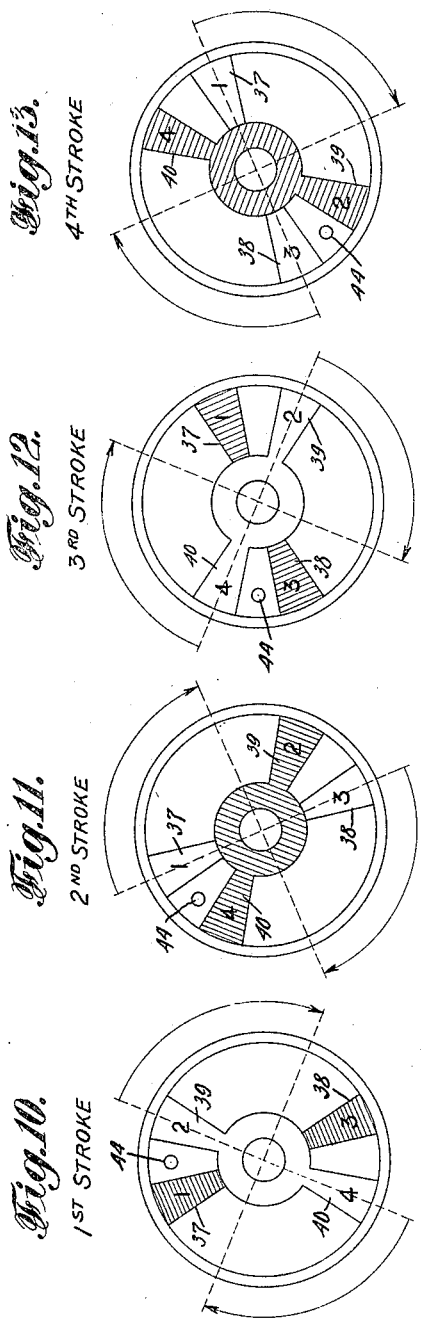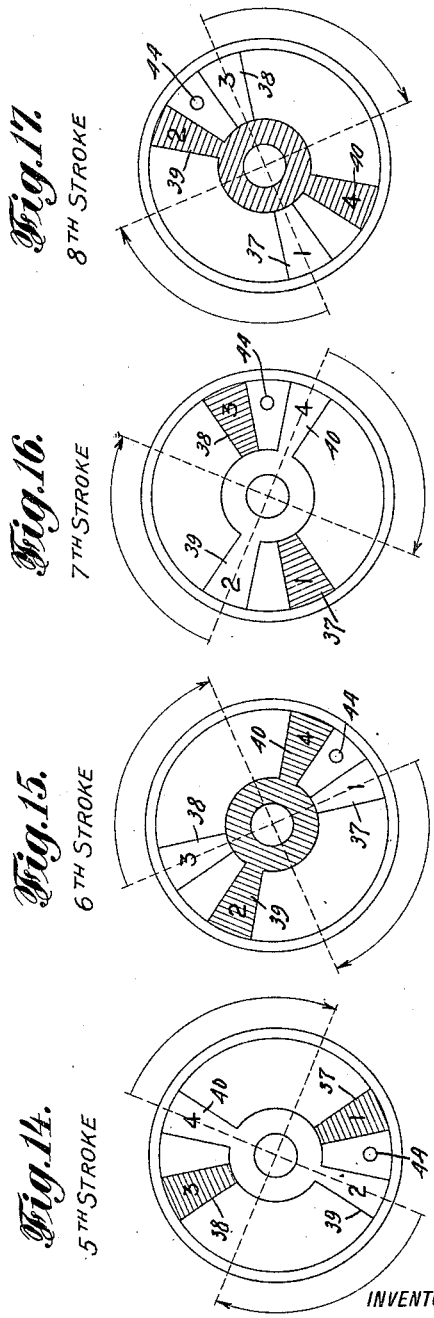

Patented June 12, 1923.

1,458,641

UNITED STATES PATENT OFFICE.

VOJTECH CIZEK, OF NEW YORK, N. Y.

ROTARY INTERNAL-COMBUSTION ENGINE.

Application filed February 28, 1921. Serial No. 448,560.

*To all whom it may concern:*

Be it known that I, VOJTECH CIZEK, citizen of Czechoslovakia, and resident of the city of New York, in the county of New York and State of New York, have invented certain new and useful Improvement in Rotary Internal-Combustion Engines, of which the following is a specification.

The present invention relates to internal combustion engines, and more particularly to rotary motors.

One of the objects of the invention is to provide a rotary engine having a cycle of operations that corresponds substantially to the four-stroke cycle, with all the advantages of the reciprocating piston engines but without the disadvantages inherent in the constructions of the latter.

Another object of the invention is to provide an engine of the type mentioned, which is of comparatively light weight in proportion to the amount of power that it is capable of developing, and one which consists of few simple parts that are adapted to be readily manufactured and assembled.

A further object of the invention is to produce a motor having a plurality of sets of blades or vanes, which are automatically caused to stop intermittently and at times automatically connected with the engine shaft, the gases resulting from the ignition of the compressed combustible mixture acting on one of the fixed vanes and consequently on the shaft, the arrangement being such that a plurality of impulses is imparted to the shaft during each revolution thereof and the vanes, while fixed to the shaft, causing, in conjunction with the stationary vanes, an inflow of a fresh charge into the engine and a compression of a charge, already in the engine, to the point of ignition.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a perspective view of a motor constructed in accordance with the present invention, part of its casing being broken away in order to show the interior construction; Fig. 2 is a longitudinal central vertical section taken through the engine; Fig. 3 is a section taken on line 3—3 of Fig. 2; Fig. 4 is a section taken on line 4—4 of Fig. 2, on a larger scale; Fig. 5 is a section taken on line 5—5 of Fig. 2, on a larger scale; Fig. 6 is a section taken on line 6—6 of Fig. 4; Fig. 7 is a section taken on line 7—7 of Fig. 4; Fig. 8 is a section taken on line 8—8 of Fig. 5; Fig. 9 is a section taken on line 9—9 of Fig. 5; and Figs. 10 to 17, inclusive, are diagrams illustrating the principle of operation of the engine.

In the drawings, the numeral 20 indicates the engine frame, including a cylindrical portion 21, within which is rotatably mounted a cylindrical casing 22, snugly fitting the said cylindrical portion. The casing is provided with tubular journals 23, which are rotatably mounted in bearings 24 on the frame 20. In the outer face of the cylindrical portion of the casing are provided annular grooves 25 and 26, closed by the cylindrical portion 21 of the frame, whereby channels are formed, one of the same constituting the intake passage and the other one the exhaust passage of the engine. The intake passage is adapted to communicate through a port 27 with the interior of the casing 22, and the exhaust passage through a port 28 with the said casing. The combustible charge is led through a pipe 29 to the intake passage, the exhaust gases being led away from the exhaust passage through a pipe, not shown. The motor shaft 30 extends centrally through the casing 22, it being rotatably mounted in bearings 31 and connected by a train 32 of gears with the said casing, the arrangement being such that the casing is rotated at half the speed of said shaft and in a direction opposite to the direction of rotation of said shaft.

On the shaft 30 are loosely mounted two tubular bodies, denoted by the numerals 33 and 34, the inner ends of the same extending into the casing and being provided with enlarged or hub portions 35 and 36, respectively. These hub portions are disposed side by side and extend each approximately one-half of the length of the casing. To the hub 35 are fixed, or there may be made integral therewith, two oppositely extending radial vanes 37 and 38, the outer ends of which are in sliding contact with the inner face of the cylindrical wall of the casing 22. These vanes extend throughout the length of the casing, and co-operate with vanes 39 and 40, which are attached or made integral with the hub 36. The vanes 39 and 40 are of the same configuration as the vanes 37 and 38 and also arranged in the same manner. All of these vanes are provided with packing material 41, in contact with the cylindrical wall and also with the heads of the casing 22. Packing rings 42 are mounted upon the hubs 35 and 36, and packing rings 43 upon the outer cylindrical face of the casing 22, for the well known purpose.

On one of the heads of the casing 22 is mounted an igniting device 44 of any suitable construction, for instance a spark plug, that is connected by a conductor 45 with a metallic ring 46, the latter being fixed to and electrically insulated from the tubular body 34 in continuous contact with a spring-pressed stationary brush 47 upon the frame 20. This brush is connected by a wire 48 with a timing device 49, which receives rotation from the shaft 30, said timing device being connected by a wire 50 with one of the terminals of a suitable source of electric energy, the other terminal of which is connected by a wire 51 with the engine frame.

To the tubular body 33 is attached a sleeve 52, loosely mounted upon the reduced portion 53 of the motor shaft 30, a similar sleeve 54 being fixed to the tubular body 34. With the sleeve 52 are made integral, or there may be attached thereto, two square blocks 55 and 56, similar blocks 57 and 58 being connected to the sleeve 54. With each of these blocks co-operate two slides, denoted, in their order, by the numerals 55', 56', 57' and 58'. Each pair of reciprocable slides is mounted in a frame, the frame carrying the slides 55' being denoted by the numeral 59, the frame connected with the slides 56' by the numeral 60, the frame carrying the slides 57' by the numeral 61 and that carrying the slides 58' by the numeral 62. The frames 59 and 61 are fixed to the main frame 20 of the motor, or in other words they are stationary, while the frames 60 and 62 are attached to sleeves 63 and 64, respectively, the said sleeves being keyed or otherwise secured to the motor shaft 30. In other words, the frames 60 and 62 rotate with the motor shaft. The inner ends of the slides are flat, to co-operate with the flat sides of the square blocks, while the outer ends of the said slides carry anti-friction rollers 65, adapted to co-operate with cams. The slides 55' and 57' co-operate with cams 66 and 67, respectively, the said cams being fixed to the sleeves 63 and 64, respectively. The rollers on the slides 56' and 58' co-operate with cams 68 and 69, respectively, the last mentioned cams being fixed to the frame 20. From this it appears that the slides carried by the fixed frames 59 and 61 co-operate with cams that rotate with the shaft, while the slides carried by the frames which rotate with the shaft coact with the stationary cams. Each pair of slides is under the action of a pair of springs 70, which have a tendency to cause the same to move away from each other, continuously holding their anti-friction rollers in engagement with the respective cam. When a rotary cam causes the slides co-operating therewith to grip the respective square block, the vanes connected therewith are kept stationary. On the other hand, when a stationary cam causes the blocks co-operating therewith to grip the respective square block, the vanes connected therewith will move with the motor shaft. The stationary and revolving cams on either side of the engine are so timed that, when the slides co-operating with one of the same grip the respective block, the other pair of slides is disengaged from its block. The cams one side of the engine are, on the other hand, so timed in relation to those on the other side, that, when one pair of vanes is connected to and rotating with the motor shaft, the other set of vanes is kept stationary, that is to say are disconnected from the said shaft.

The frame 20 and the casing 22 are provided with radiating ribs 71 and 72, respectively, the engine shown being of the air cooled type. It is obvious, however, that the engine may be provided with a water cooling system of any preferred construction.

The operation of the engine is as follows: As above stated, the engine operates under the four-stroke cycle, that is to say a working period follows ignition of the charge, followed by exhaust, charging and compression periods. Assuming that the motor shaft rotates in the direction of the arrow shown in Fig. 3 of the drawings, the vanes will obviously rotate in the same direction, and the motor casing, as above stated, in the opposite direction. The cams above referred to are so constructed that the vanes, when connected to the motor shaft, move with the same through an angular distance of 90°, as shown in the diagrams illustrated in Figs. 10 to 17, inclusive, the other set remaining stationary while the motor shaft makes one-quarter of a turn. The two sets of vanes divide the motor casing into a series of four chambers, between the vanes in each of which chambers a charge of explosive mixture may be drawn, compressed, exploded and exhausted successively. Assuming now that the parts are positioned as shown in Fig. 10 of the drawings with the vanes 37 and 38 held stationary and the vanes 39 and 40 connected to the motor shaft, the chamber between the vanes 37 and 39 is filled with a compressed charge of explosive gas, the chamber between the vanes 37 and 40 contains a fresh charge, the chamber between the vanes 39 and 38 an expanded exploded charge, and the chamber between the vanes 38 and 40 is about to be opened to the intake port. The spark plug is directly opposite the chamber containing the compressed charge of explosive gas, the spark being formed in the usual manner when the elements are in the positions shown in Fig. 10, thereby igniting the compressed explosive charge, which expands, tending to separate the vanes 37 and 39. Inasmuch as the vane 37 is held stationary, the entire force of the expansion will be spent on the vane 39, and consequently on the motor shaft. The elements are thereby brought into the positions shown in Fig. 11 of the drawings. While the elements are brought into these positions, the exhaust gases of the previous explosion are expelled from the motor, the fresh charge between the vanes 40 and 37 compressed, and a new charge drawn into the motor casing between the vanes 40 and 38. At the same time, the casing moves in the direction indicated, bringing the spark plug into position with the compartment in which the charge has been compressed ready for ignition (Fig. 11). When the elements are in these positions, the vanes 39 and 40 are held stationary, while the vanes 37 and 38 are adapted to move, they being clutched to the motor shaft. Ignition having taken place, the vane 37 is caused to move 90° into the position shown in Fig. 12 of the drawings, the cycle of operation above described being repeated.

From an inspection of Figs. 10 to 17 of the drawings it appears that, while the motor shaft makes two complete revolutions, each set of vanes is moved intermittently 360°, and the motor casing and thus the spark plug caused to complete an entire turn. It is thus obvious that four ignitions will result during each complete revolution of the motor shaft, the ignitions occurring 45° apart.

What I claim is:—

1. A rotary internal combustion engine comprising a cylindrical casing, a driven shaft extending therethrough, a gearing connecting said casing and shaft for continuously rotating said casing, two sets of radial vanes on said shaft within said casing, and a mechanism associated with each set of vanes for alternately keeping the same stationary and fixing the same to said shaft, the two mechanisms associated with said vanes working in opposition.

2. An internal combustion engine according to claim 1, comprising an ignition device mounted upon said casing, said casing being provided with an inlet port and an exhaust port.

3. In a rotary internal combustion engine according to claim 1, said casing moving at a speed half of that of said shaft.

4. In a rotary internal combustion engine according to claim 1, said casing and shaft moving in opposite directions.

5. In a rotary internal combustion engine according to claim 1, said casing moving at a speed half of that of said shaft and in a direction opposite to that of said shaft.

6. In a rotary internal combustion engine according to claim 1, said vanes moving intermittently one-quarter of a turn and said casing rotating in a direction opposite to that of said shaft.

7. In a rotary internal combustion engine according to claim 1, said vanes moving intermittently one-quarter of a turn and said casing rotating in a direction opposite to that of said shaft at a speed one-half of that of said shaft.

Signed at New York, in the county of New York and State of New York this 1st day of Febr., A. D. 1921.

VOJTECH CIZEK.